United States Patent
Chaudhry et al.

(10) Patent No.: US 12,296,538 B2
(45) Date of Patent: May 13, 2025

(54) METHODS FOR LASER CALIBRATION IN ADDITIVE MANUFACTURING SYSTEMS, AND SYSTEMS CONFIGURED FOR SAME

(71) Applicant: Baker Hughes Oilfield Operations LLC, Houston, TX (US)

(72) Inventors: Gunaranjan Chaudhry, Karnataka (IN); Thomas Dobrowolski, The Woodlands, TX (US); Chad Yates, Houston, TX (US); Jayesh Jain, The Woodlands, TX (US); Mackenzie Dreese, Oklahoma City, OK (US); Lakshmi Jyotshna Vendra, Spring, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/653,017

(22) Filed: Mar. 1, 2022

(65) Prior Publication Data

US 2023/0011144 A1    Jan. 12, 2023

Related U.S. Application Data

(60) Provisional application No. 63/155,260, filed on Mar. 1, 2021.

(51) Int. Cl.
*B29C 64/393* (2017.01)
*B22F 10/28* (2021.01)
(Continued)

(52) U.S. Cl.
CPC ............ *B29C 64/393* (2017.08); *B22F 10/28* (2021.01); *B22F 10/31* (2021.01); *B22F 10/36* (2021.01);
(Continued)

(58) Field of Classification Search
CPC ... B29C 64/393; B29C 64/153; B23K 26/705; B23K 26/03; B23K 26/0626;
(Continued)

(56) References Cited

U.S. PATENT DOCUMENTS

2008/0025352 A1* 1/2008 Egawa ................. H01S 3/102
372/29.012
2014/0356472 A1* 12/2014 Oberhofer ............. B22F 10/28
425/174.4
(Continued)

FOREIGN PATENT DOCUMENTS

DE    112018001597 B4    6/2021
EP    0731743 B1    4/1998
(Continued)

OTHER PUBLICATIONS

Complementary use of pulsed and continuous wave emission modes (Year: 2017).*

(Continued)

*Primary Examiner* — Thien S Tran
*Assistant Examiner* — Simpson A Chen
(74) *Attorney, Agent, or Firm* — TraskBritt

(57) ABSTRACT

A method of calibrating a laser of an additive manufacturing system involves processing a test pattern with the laser while varying one or more of laser power and/or scan speed. Thermal energy emitted from the resulting meltpool is measured while processing the test pattern. The power of the laser is calculated using a relationship between volumetric energy density and the thermal emissions, and the laser power is adjusted based on the calculated laser power. An additive manufacturing system for performing such a method may include a laser, a thermal sensor configured to measure meltpool thermal emissions, a processor configured to calculate a laser power based on the measured meltpool (Continued)

thermal emissions of the test pattern, and a controller configured to adjust the laser power based on the calculated laser power.

11 Claims, 3 Drawing Sheets

(51) Int. Cl.
| | |
|---|---|
| *B22F 10/31* | (2021.01) |
| *B22F 10/36* | (2021.01) |
| *B22F 12/90* | (2021.01) |
| *B23K 26/03* | (2006.01) |
| *B23K 26/06* | (2014.01) |
| *B23K 26/70* | (2014.01) |
| *B29C 64/153* | (2017.01) |
| *B33Y 10/00* | (2015.01) |
| *B33Y 30/00* | (2015.01) |
| *B33Y 50/02* | (2015.01) |

(52) U.S. Cl.
CPC .............. *B22F 12/90* (2021.01); *B23K 26/03* (2013.01); *B23K 26/0626* (2013.01); *B23K 26/705* (2015.10); *B29C 64/153* (2017.08); *B33Y 10/00* (2014.12); *B33Y 30/00* (2014.12); *B33Y 50/02* (2014.12)

(58) Field of Classification Search
CPC ......... B33Y 10/00; B33Y 30/00; B33Y 50/02; B22F 10/31; B22F 12/90; B22F 10/36; B22F 10/28
USPC ................................................... 219/121.62
See application file for complete search history.

(56) References Cited

U.S. PATENT DOCUMENTS

| | | | |
|---|---|---|---|
| 2016/0236279 A1 | 8/2016 | Ashton et al. | |
| 2017/0090462 A1* | 3/2017 | Dave | B33Y 50/00 |
| 2017/0120337 A1 | 5/2017 | Kanko et al. | |
| 2017/0242424 A1 | 8/2017 | Spears | |
| 2017/0334144 A1 | 11/2017 | Fish et al. | |
| 2018/0193959 A1* | 7/2018 | Marchione | B33Y 50/02 |
| 2018/0264553 A1 | 9/2018 | Dave et al. | |
| 2019/0047226 A1 | 2/2019 | Ishikawa et al. | |
| 2019/0210353 A1 | 7/2019 | Dave et al. | |
| 2019/0229252 A1* | 7/2019 | Leblanc | B22F 12/41 |
| 2019/0323951 A1 | 10/2019 | Gold et al. | |
| 2021/0394302 A1* | 12/2021 | Jacquemetton | B33Y 30/00 |
| 2022/0001497 A1 | 1/2022 | Dave et al. | |
| 2022/0111444 A1 | 4/2022 | Madigan et al. | |

FOREIGN PATENT DOCUMENTS

| | | |
|---|---|---|
| JP | 2018-130728 A | 8/2018 |
| WO | 2015/009769 A1 | 1/2015 |
| WO | 2017/165436 A1 | 1/2017 |

OTHER PUBLICATIONS

Limitations of Volumetric Energy Density (Year: 2019).*
International Search Report for International Application No. PCT/US2022/070885, 4 pages.
International Written Opinion for International Application No. PCT/US2022/070885, 4 pages.
European Office Action and Search Report for Application No. 22764250.1 dated Jan. 21, 2025, 12 pages.

* cited by examiner

METHODS FOR LASER CALIBRATION IN ADDITIVE MANUFACTURING SYSTEMS, AND SYSTEMS CONFIGURED FOR SAME

CROSS-REFERENCE TO RELATED APPLICATION

This application claims the benefit under 35 U.S.C. § 119(e) of U.S. Provisional Patent Application Ser. No. 63/155,260, filed Mar. 1, 2021, the disclosure of which is hereby incorporated herein in its entirety by this reference.

TECHNICAL FIELD

Calibration of lasers used in additive manufacturing. Specifically, in-process calibration of lasers using sensor data to estimate laser power.

BACKGROUND

Additive Manufacturing is a new, rapidly growing industry, which employs a variety of manufacturing methods that manufacture workpieces layer-by-layer, in contrast with common subtractive manufacturing techniques that create the desired workpiece by removing material from bar stock. Additive manufacturing uses feedstock material in the form of powder, wire, filament, or slurry, and works with a variety of materials such as metals, plastics, and ceramics.

Three-dimensional (3D) additive manufacturing, also termed "3D printing," involves the spreading of a layer of particulate material on a substrate, and then binding selected portions of the particulate layer together, for example by laser sintering. This sequence is repeated for additional particulate layers until a desired 3D structure has been constructed. Post-processing of the three-dimensionally printed part is often required in order to strengthen and/or densify the part.

An obstacle to industrial adoption of 3D printing is quality assurance of the 3D printed parts. Various defects can be introduced during printing that can lead to part rejection or even failure in service. Actual laser power delivered during printing is an important variable that impacts the resulting quality of the resulting 3D printed part, and material properties thereof. The actual laser power delivered to the feedstock material deviates due to various factors, such as laser drifts and degradation over time, lens defects, and unfavorable chamber conditions. Volumetric Energy Density (VED) delivered during printing is an important variable that can impact the resulting quality and material properties. VED is a function of parameters such as laser power, scan speed, laser size, and characteristics of optical components between the laser and the feedstock material.

In previously known 3D printing systems and methods that involve use of lasers for consolidation and/or solidification of the feedstock material, manual and time-consuming calibration processes are performed periodically, such as once every three to six months, for example, in an effort to ensure consistent fabrication of parts with little to no defects. Some calibration processes involve measurement of power of the input laser beam, which may not accurately represent the actual power delivered to the feedstock material. Lasers are typically calibrated offline and in a static configuration. The actual VED can drift significantly over time between calibrations due to various reasons including degradation of laser and the motion control system, lens defects, gas flow issues, and other unfavorable chamber conditions. Inaccurate VED can adversely impact part quality, especially with aggressive process parameters used near the boundaries of operating window for productivity. The problem is exacerbated for multi-laser systems where different lasers could have inconsistent VEDs.

BRIEF SUMMARY

In some embodiments, the present disclosure includes a method of calibrating a laser on an additive manufacturing system. A test pattern is processed with the laser while varying one or more of laser power and/or scan speed. Thermal energy emitted from feedstock material in a meltpool is measured while processing the test pattern. Laser power is then calculated using a relationship between volumetric energy density and the meltpool thermal emissions, and a power of the laser is adjusted based on the calculated laser power.

In additional embodiments, the present disclosure includes an additive manufacturing system comprising a laser, and a thermal sensor located and configured to measure meltpool thermal emissions of a meltpool formed in feedstock material using the laser. The system further includes a processor configured to calculate a laser power based on the measured meltpool thermal emissions, and a controller configured to adjust a power of the laser based on the calculated laser power.

In yet further embodiments, the present disclosure includes a method of controlling a laser. Thermal energy density of a portion of a part produced by additive manufacturing is measured. A laser power is calculated using the measured thermal energy density and a relationship between thermal energy density and laser power. The power provided by the laser is then adjusted responsive to the calculated laser power. The laser then may be automatically calibrated in situ in a closed loop manner, or the laser may at least be flagged for calibration when a difference between calculated laser power and applied laser power exceeds a threshold value.

BRIEF DESCRIPTION OF THE DRAWINGS

The illustrations presented in this disclosure are not meant to be actual views of any particular additive manufacturing system or device but are merely idealized representations employed to describe illustrative embodiments. Thus, the drawings are not necessarily to scale.

While this disclosure concludes with claims particularly pointing out and distinctly claiming specific embodiments of the present disclosure, various features and advantages of embodiments within the scope of this disclosure may be more readily ascertained from the following description of example embodiments, when read in conjunction with the accompanying drawings, in which:

DETAILED DESCRIPTION

Figure 1:
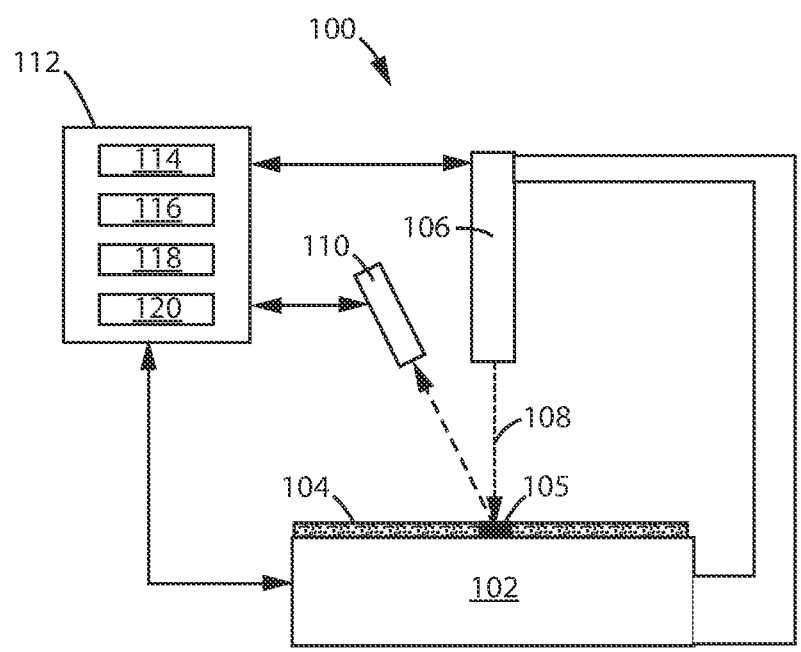
FIG. 1 shows an example of an additive manufacturing system that is configured for dynamic in situ calibration of delivered laser power in accordance with embodiments of the present disclosure.

Any headings used herein should not be considered to limit the scope of embodiments of the invention as defined by the claims below and their legal equivalents. Concepts described in any specific heading are generally applicable in other sections throughout the entire specification.

Furthermore, the illustrations presented herein are not actual views of any particular additive manufacturing system, calibration device or system, or component of such a system, but are merely idealized representations, which are employed to describe embodiments of the present disclosure.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing and/or testing tolerances. For example, a parameter that is substantially or about a specified value may be at least about 90% the specified value, at least about 95% the specified value, at least about 99% the specified value, or even at least about 99.9% the specified value.

As used herein, terms of relative positioning, such as "above," "over," "under," and the like, refer to the orientation and positioning shown in the figures. During real-world formation and use, the structures depicted may take on other orientations (e.g., may be inverted vertically, rotated about any axis, etc.). Accordingly, the descriptions of relative positioning must be reinterpreted in light of such differences in orientation (e.g., resulting in the positioning structures described as being located "above" other structures underneath or to the side of such other structures as a result of reorientation).

As used herein, any relational term, such as "first," "second," "lower," "upper," "outer," "inner," etc., is used for clarity and convenience in understanding the disclosure and accompanying drawings, and does not connote or depend on any specific preference or order, except where the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

FIG. 1 shows an example of an additive manufacturing system 100 that is configured for dynamic in situ calibration of delivered laser power in accordance with embodiments of the present disclosure. The system 100 includes a substrate or platform 102 on which particulate feedstock material 104 may be placed. The feedstock material 104 is typically spread relatively uniformly as a layer of uniform thickness over the platform 102 using mechanical equipment or subsystems of the system 100 that are not shown in FIG. 1 for simplicity.

The system 100 further includes at least one laser 106 configured to emit a laser beam 108 toward the feedstock material 104 on the platform 102. The energy of the laser beam 108 is absorbed by the feedstock material 104, resulting in heating (and possibly melting) of the feedstock material 104 in a localized "meltpool" 105 (although the heated feedstock material 104 may not be melted in the meltpool 105 in some systems, depending on the nature of the feedstock material, the part being formed, etc.). The heated feedstock material 104 in the meltpool 105 will emit thermal energy.

The system 100 also includes a meltpool monitoring system 110 that is configured to detect and measure the thermal energy emitted by the heated feedstock material 104 in the meltpool 105. The meltpool monitoring system 110 may include, for example, an infrared detector, or any other sensor device that could be used to quantitatively measure a thermal energy of the heated feedstock material 104 in the meltpool 105.

The system 100 includes a control system 112 that is configured to control operation of the various active components of the system 100. The control system 112 includes a signal processor 114, memory 116, and input/output devices 118. The control system 112 further includes a calibration module 120, which may be in the form of software residing in the memory 116, for example. The control system 112 may be configured to perform, using the calibration module 120, dynamic in-situ calibration of the laser 106 using information obtained from the meltpool monitoring system 110, as discussed in further detail herein below.

Volumetric Energy Density (VED) of the feedstock material 104 in the meltpool 105 may be estimated by dividing the laser power (e.g., in joules) by the volume of the feedstock material 104 interacting with the laser 106. In some examples, the depth of the meltpool 105 is approximated by the depth of the layer of unconsolidated particular feedstock material 104. The width of the meltpool 150 may be estimated from the hatch distance between adjacent pulses of the laser beam 108. A length of the meltpool 150 may be estimated from the scan speed and pulse duration of the laser beam 108. These estimates may be combined to generate a volume of the meltpool 105, which is combined with the energy of the laser beam 108 to provide an energy per unit volume. This value may be compared and correlated with the thermal emissions from the meltpool 105 as detected by the meltpool monitoring system 110. That correlation appears to be linear based on the data presented in FIG. 2, as discussed herein below. Thus, the meltpool thermal emission values can be used to monitor changes in the VED and, similarly, changes in the energy of the laser beam 108 emitted from the laser 106. This provides an efficient and economical method of monitoring the energy of the laser beam 108. Notably, this approach uses the applied laser energy rather than the generated laser energy as involves measuring the thermal emissions from the meltpool 105 in real time during a manufacturing process carried out using the system 100 to form a 3D printed part.

This disclosure presents a novel method to dynamically verify the delivered VED while 3D printing. The method uses unique associations between input VED and measured meltpool thermal emissions to detect anomalous VEDs, or gradually changing VED. In one embodiment, a linear relationship between input VED and measured thermal emissions is used.

An in-situ calibration test may be conducted during deposition of a first layer or a first few layers of a 3D printing process, where input parameters are strategically varied in different regions of the layer of feedstock material 104, while inputting varying amounts of VED by the laser beam 108 of the laser 106. The input parameters can be any parameter of the 3D printing process that may affect the actual VED and the resulting measured thermal emissions. These input parameters may include but are not limited to the laser power, laser scan speed, laser pulsing characteristics, angle of incidence of the laser beam, the position of the meltpool in the horizontal XY plane of the 3D printing system, characteristics of optical components interacting with the laser beam between the laser and the meltpool, and environmental conditions within the 3D printing system (e.g., temperature, pressure, humidity, gas composition, gas flow characteristics, moisture content in feedstock material, etc.), etc. If any of these operational parameters can be maintained in uniform control between and during 3D printing processes such that there is no process variations due to variation in these parameters (such as environmental conditions within the 3D printing system), it may be possible to exclude those parameters from the calibration process.

The parameters of the calibration test can be tailored to the parameters used in a specific 3D printing process. The resulting thermal emissions as detected and measured using the meltpool monitoring system 110 are recorded in correlation with each of these regions. The pre-established relationships between VED and measured thermal emissions are then used to estimate actual VED, laser power, scan speed, etc. These parameters are then adaptively adjusted in situ during the 3D printing process for the remainder of the manufacturing process using closed-loop control of the control system 112 to ensure that a predefined and intended amount of VED is delivered to the feedstock material 104 in the meltpool 105.

Actual laser power delivered to the feedstock material 104 by the laser beam 108 during 3D printing is an important variable that impacts the resulting quality and material properties of the resulting 3D printed part. The actual laser power delivered to the feedstock material 104 by the laser beam 108 deviates due to various factors such as laser drifts and degradation over time, lens defects, and unfavorable chamber conditions. The currently known methods are inadequate and employed too infrequently to detect such errors soon enough to avoid material degradation and imperfections in the resulting 3D printed parts. Embodiments of the present disclosure provide a method for dynamically verifying and adjusting the delivered power, in situ, while performing a 3D printing process in the fabrication of a 3D printed part. Unique associations between input parameters and measured meltpool thermal emissions are determined and used to detect anomalies in power delivered by the laser beam 108. The input parameters then may be adaptively adjusted or appropriate corrective actions otherwise taken to ensure that the predefined and intended amount of power is delivered by the laser 106 to the feedstock material 104 in the meltpool 105. This may enhance the quality and consistency of 3D printed parts fabricated using methods and systems of the present disclosure relative to known similar methods and systems.

Automated calibration in real-time is a new capability that can significantly improve quality and consistency of 3D printed parts. The system 100 can even correct for the uncertainties in the power of the laser 106, which are typically specified as +/−5% by original equipment manufacturers (OEMs). Additionally, laser degradation can be monitored for predictive maintenance, thereby reducing downtime. The method can also be used to take corrective actions through closed-loop control in same or subsequent layers of the feedstock material 104. The described approach may offer reduced cost and improved quality.

Actual power delivered by the laser 106 can deviate due to various reasons. For multi-laser systems, different lasers could be delivering different amounts of power despite periodic calibrations. Inaccurate laser power can adversely impact quality of the printed parts, more so with aggressive laser parameters used near the boundaries of operating windows. In accordance with the present disclosure, the laser 106 may be calibrated in-situ using the meltpool monitoring system 110 and the control system 112.

Figure 2:
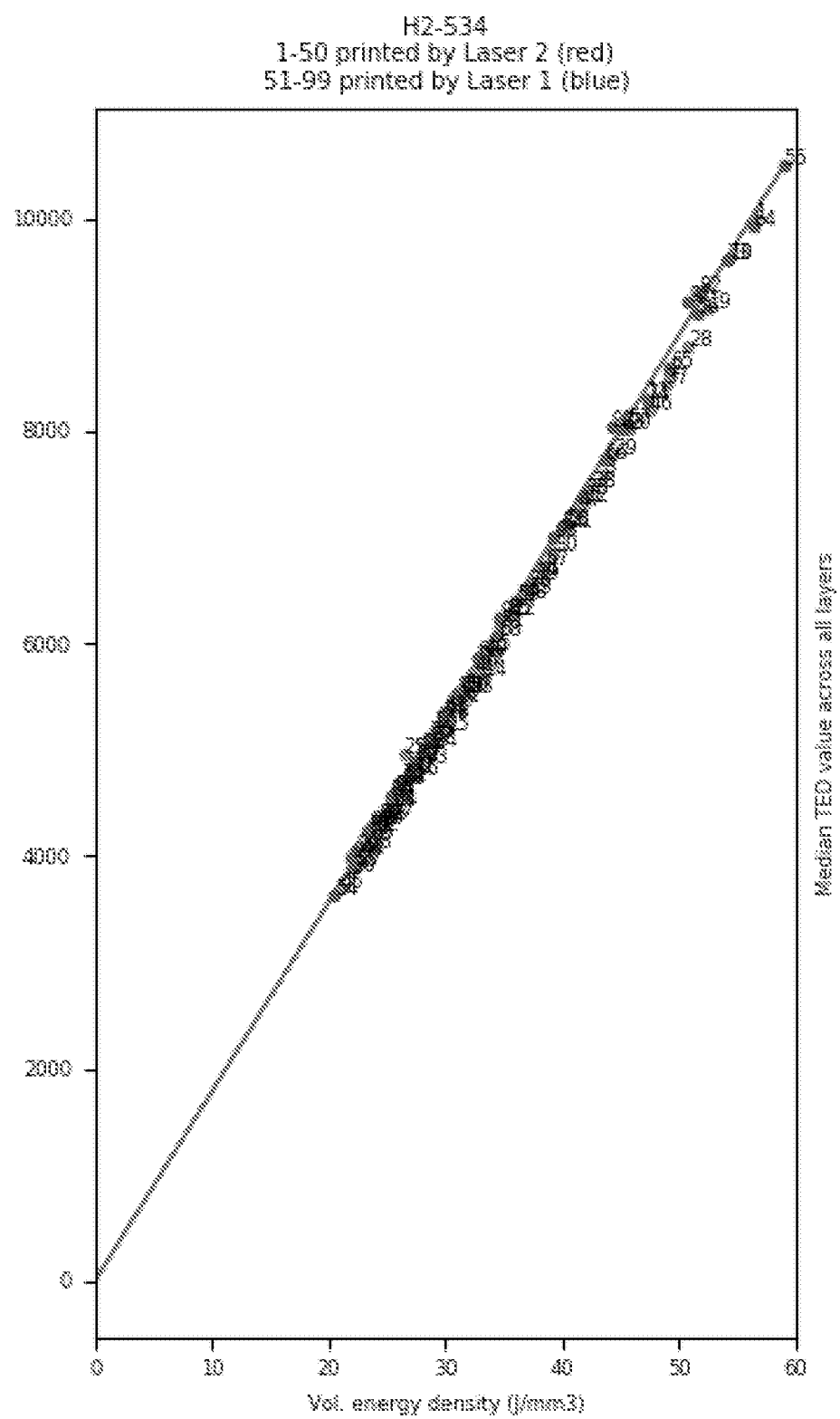
FIG. 2 shows an example of a linear relationship between measured volumetric energy density (VED) and thermal emissions for two different lasers.

A linear association has been observed between the applied input (e.g., VED) and the measured output (e.g., thermal energy density), as is illustrated in FIG. 2. FIG. 2 shows repeatability with two different lasers each exhibiting a liner relationship between the applied input VED and the measured output in thermal energy density, and having highly correlated slopes. Accordingly, information about VED delivered by the laser beam 108 of the laser 106 to the feedstock material 104 in the meltpool 105 may be confidently inferred on the basis of the thermal emissions measured using the meltpool monitoring system 110.

In accordance with embodiments of the present disclosure, unique associations between input parameters and resulting meltpool measurements are used to detect anomalies in power delivered to the feedstock material 104 by the laser 106. Thus, the control system 112 may implement real-time calibration of the parameters of the laser 106 and closed-loop control to correct for detected anomalies.

In accordance with embodiments of the present disclosure, a first layer or a first few layers of feedstock material 104 may be irradiated with a laser beam 108 of varying amount of power, scan speed, etc., in different regions, thereby varying the amount of VED delivered to the feedstock material 104 in the meltpool 105. The resulting thermal emission is detected and measured using the meltpool monitoring system 110, and the data for these regions is recorded in memory 116 of the control system 112. The pre-established relationship between VED and emissions may be used to estimate actual VED from emission measurements obtained using the meltpool monitoring system 110. Consequently, actual power delivered by the laser 106 is estimated and reported. The laser parameters are adjusted for the remainder of the 3D printing process to correct for deviation in the actual power versus the desired power.

In some examples, the first few layers are the first few layers of the part being fabricated. In other examples, the first few layers are a formed test pattern. In some examples, the printing is calibrated continuously throughout the 3D printing of the part. The meltpool thermal emissions are measured by the meltpool monitoring system 110 synchronously with the pulsing of the laser beam 108. In some examples, a thermal emission is also measured prior to the pulsing of the laser beam 108. In some examples, the thermal emissions are measured over the layer prior to pulsing the laser beam 108 to form the meltpool 105 and measure the thermal emissions from the meltpool 105. In some examples, the calibration is performed during each part that is 3D printed using the system 100. In some examples, the calibration is performed on a periodical time basis, for example, daily, weekly, etc. The method may be used to flag the system for calibration. In some examples, the method detects when the laser power deviation passes a threshold value and flags the system for calibration and/or maintenance. This allows calibration and/or maintenance to be performed before the laser exhibits a characteristic or parameter outside of a specified operating tolerance window. In some examples, the system 100 provides a report of the laser power over time. The additive manufacturing system 100 may provide laser power for the past number of parts, e.g., 5 parts, 10 parts, etc. In some examples, this information is provided as a trend graph. This may allow a user to schedule maintenance activities based on trends in the laser power over time.

Other types of sensors and measurements could be used to establish associations between input power and output response of the laser beam 108. These include high-frequency infrared, near infrared, acoustic, optical tomography, etc.

Figure 3:
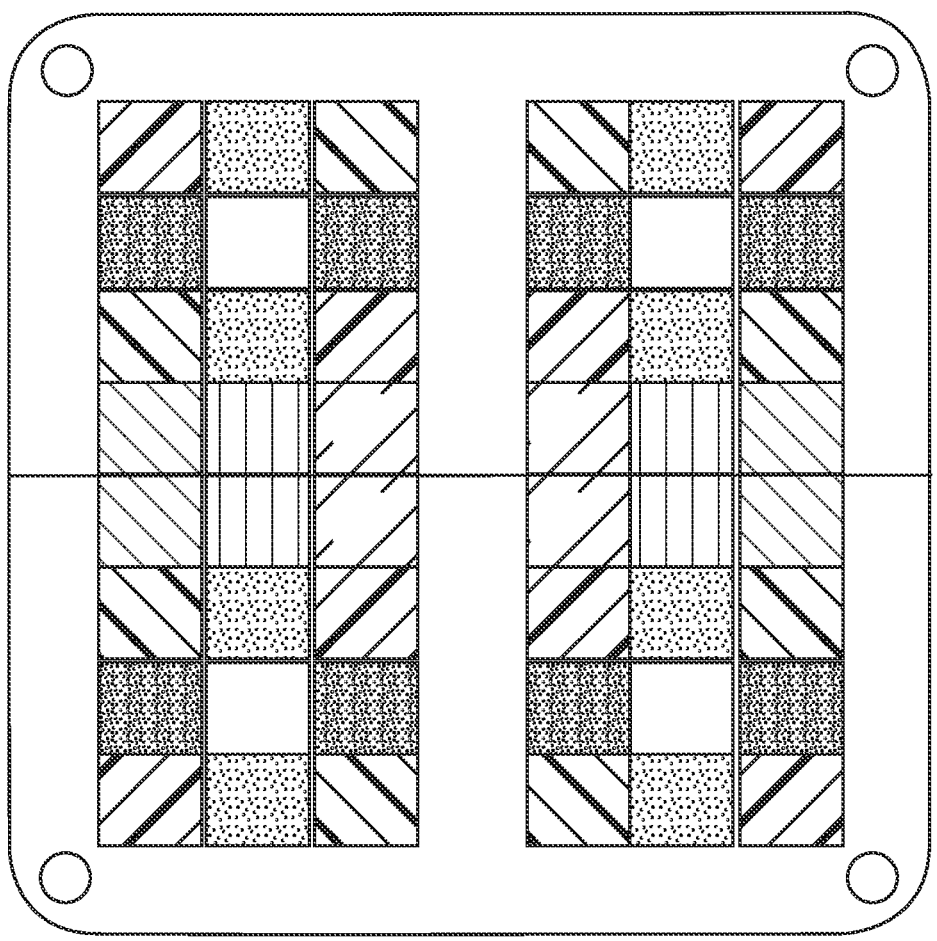
FIG. 3 shows an example of a test pattern that may be used to dynamically calibrate a laser a laser in situ in a 3D printing process and system.

FIG. 3 shows an example of a test pattern for calibrating the laser 106. The test pattern may be applied at the base of a part being produced by additive manufacture. The test pattern may be processed in an unused portion or portions of the build volume of feedstock material 104. The test pattern may be symmetrical or asymmetrical. The test pattern may include portions processed with different lasers. In an example embodiment, a system 100 includes multiple lasers 106, which are calibrated together with a single test pattern. The test pattern includes regions processed with different parameters, for example, different laser power, scan speed, etc. The parameters may be selected based on the parameters to be used to 3D print the 3D printed part to be formed. The parameters may be selected based on a pre-existing test plan. In some examples, the test pattern includes replicates. The test pattern may be randomized. In some examples, the test pattern is randomized by blocks.

The operational parameters used by the system 100 to process each region of the test pattern (FIG. 3), and the corresponding measurement data obtained using the meltpool monitoring system 110, may be recorded in memory 116 of the control system 112. That recorded data then may be used by the calibration module 120 of the control system 110 to monitor the VED delivered to the feedstock material 104 in the meltpool 105 in real time in situ during the 3D printing process, and to automatically adjust the operational parameters of the 3D printing in real time in situ during the 3D printing process, so as to ensure that the actual delivered VED is as close as possible to the predetermined and intended VED for the 3D printing process.

In some embodiments, the calibration module 120 of the control system 100 may employ closed-loop calibration and control algorithms that make use of neural networks, machine learning, and other aspects of artificial intelligence to adjust operational parameters of the system 100 so as to improve the operational efficiency of the 3D printing process and the quality of the resulting 3D printed parts.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. An additive manufacturing system comprising: a laser; a sensor configured for measuring a thermal energy of a portion of a part produced by the additive manufacturing system by obtaining data from a meltpool of feedstock material formed using the laser; a monitoring system comprising:
at least one processor; and
at least one computer-readable storage medium storing instructions thereon that, when executed by the at least one processor, cause the monitoring system to:
irradiate at least a first layer of the portion of the part produced by additive manufacturing by pulsing the laser using varying amounts of power and scan speed in different regions;
measure thermal emissions with a sensor to obtain a thermal energy density of the portion, including the thermal energy density in each of the different regions of the portion, the thermal emissions are measured synchronously with the pulsing of the laser to obtain thermal energy density values;
determine a volumetric energy density of the laser used for varying the amounts of power in each of the different regions from the thermal energy density values measured in each of the different regions using a pre-established relationship between the volumetric energy density and the thermal energy density values;
calculate a delivered laser power of each of the different regions using the volumetric energy density determined from the pre-established relationship between the volumetric energy density and the thermal energy density values; and
flag the laser for calibration when a difference between the delivered laser power and an applied laser power exceeds a threshold value; and
a controller configured to correct for deviations in the delivered laser power versus the applied laser power in the different regions of the portion by adjusting the power provided by the laser responsive to the delivered laser power.

2. The system of claim 1, further comprising a second laser.

3. The system of claim 1, wherein the system is configured to process a test pattern while varying laser power and scan speed and measuring the thermal energy while producing the test pattern.

4. The system of claim 3, wherein the test pattern comprises a series of blocks.

5. A method of controlling a laser, comprising:
irradiating at least a first layer of a portion of a part produced by additive manufacturing by pulsing the laser using varying amounts of power and scan speed in different regions;
measuring thermal emissions with a sensor to obtain a thermal energy density of the portion including measuring the thermal energy density in each of the different regions of the portion, the thermal emissions are measured synchronously with the pulsing of the laser to obtain thermal energy density values;
determining a volumetric energy density of the laser used for varying the amounts of power in each of the different regions from the thermal energy density values measured in each of the different regions using a pre-established relationship between the volumetric energy density and the thermal energy density values;
calculating a delivered laser power of each of the different regions using the volumetric energy density determined from the pre-established relationship between the volumetric energy density and the thermal energy density values;
adjusting the power provided by the laser responsive to the delivered laser power to correct for deviations in the delivered laser power versus an applied laser power in the different regions of the portion; and flagging the laser for calibration when a difference between the delivered laser power and the applied laser power exceeds a threshold value.

6. The method of claim 5, further comprising processing a test pattern with varying laser power and scan speed.

7. The method of claim 5, wherein the method is performed in real time in situ during an additive manufacturing process for manufacturing the part.

8. The system of claim 1, wherein the pre-established relationship between the thermal energy density values and the volumetric energy density is obtained by:

determining an estimated volumetric energy density by dividing the delivered laser power by a volume of the feedstock material interacting with the laser, the volume of the feedstock material being determined by: estimating a depth of the meltpool using a depth of a layer of unconsolidated particular feedstock material; estimating a width of the meltpool by a hatch distance between adjacent pulses of the laser; and estimating a length of the meltpool from a scan speed and pulse duration of the laser; and comparing and correlating the estimated volumetric energy density with meltpool thermal emissions data obtained previous to irradiating at least a first layer of a portion of a part produced by additive manufacturing by pulsing the laser using varying amounts of power and scan speed in different regions.

9. The system of claim 1, wherein the thermal emissions are measured synchronously with the pulsing of the laser by measuring the thermal emissions prior to and after each pulse of the laser.

10. The method of claim 5, the pre-established relationship between the thermal energy density values and the volumetric energy density is obtained by:

determining an estimated volumetric energy density by dividing the delivered laser power by a volume of feedstock material interacting with the laser, the volume of the feedstock material being determined by: estimating a depth of the meltpool using a depth of the layer of unconsolidated particular feedstock material; estimating a width of a meltpool by a hatch distance between adjacent pulses of the laser; and estimating a length of the meltpool from a scan speed and pulse duration of the laser; and comparing and correlating the estimated volumetric energy density with meltpool thermal emissions data obtained previous to irradiating at least a first layer of a portion of a part produced by additive manufacturing by pulsing the laser using varying amounts of power and scan speed in different regions.

11. The method of claim 5, wherein the thermal emissions are measured synchronously with the pulsing of the laser by measuring the thermal emissions prior to and after each pulse of the laser.

* * * * *